H. L. JENKINS.
FIRE HOSE CARRIER.
APPLICATION FILED MAY 28, 1909.
954,807.
Patented Apr. 12, 1910.
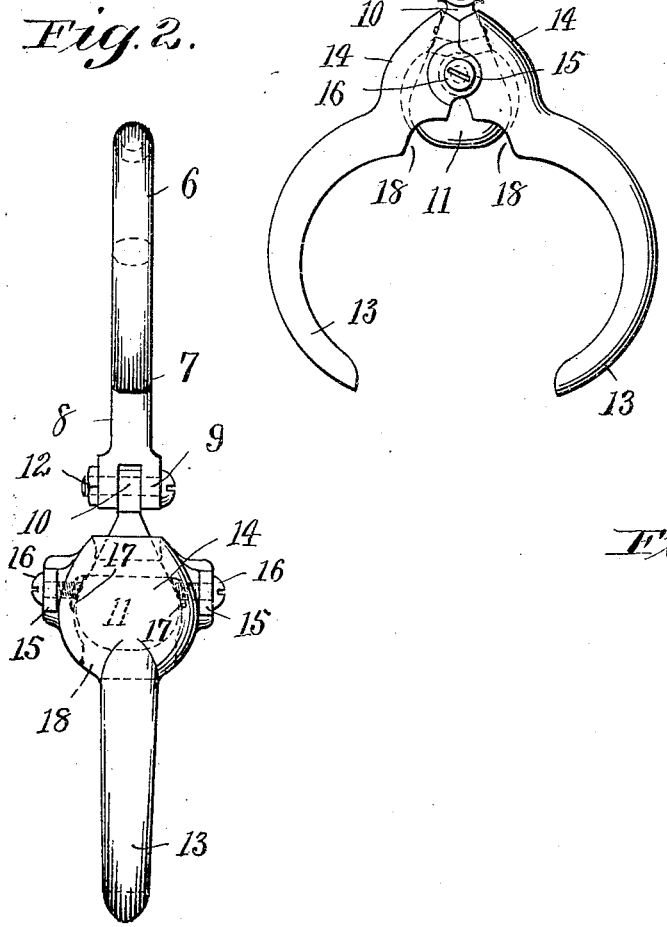
Witnesses
Ruth Raymond
Ernst P. Wold
Inventor
Harvey L. Jenkins
By Chamberlain & Newman
Attorneys

UNITED STATES PATENT OFFICE.

HARVEY L. JENKINS, OF BRIDGEPORT, CONNECTICUT.

FIRE-HOSE CARRIER.

954,807.   Specification of Letters Patent.   Patented Apr. 12, 1910.

Application filed May 28, 1909. Serial No. 498,971.

*To all whom it may concern:*

Be it known that I, HARVEY L. JENKINS, a citizen of the United States, and resident of Bridgeport, in the county of Fairfield and State of Connecticut, have invented certain new and useful Improvements in Fire-Hose Carriers, of which the following is a specification.

This invention relates to improvements in hose carriers for the use of firemen in the handling and carrying of water hose, when at work upon a fire, and likewise for supporting such a hose from a ladder or portions of a building when desirable to elevate the hose from the ground.

The invention relates especially to that class of devices shown and described in my former patent #918,159 dated April 13, 1909, and is designed as an improvement upon the construction therein contained.

It is the object of my invention to provide a swivel form of connection intermediate of the handle and jaws of carriers of this class, whereby the jaws may not only be operated but the handle turned with respect to the jaws thus rendering the device more flexible and easier adjusted while handling a hose, as will later be more fully described.

Similar characters of reference denote like or corresponding parts throughout the several figures of the accompanying drawings, and of which, Figure 1, shows a side elevation of my improved carrier complete, the jaws being in an open position. Fig. 2, is an edge view of the carrier as seen in Fig. 3, and Fig. 3, is a side elevation of the carrier as shown in Fig. 1, but with the jaws closed and the portion thereof surrounding the ball socket broken away to better illustrate the swivel connection.

In detail 6 represents the upper or handle member of the carrier which includes a loop forming the handle proper, and 7 hooks on either end of the handle by means of which the jaws may be attached to the rounds of a ladder or an overhang of a building.

8 represents a central stem or shank the lower end of which is divided as at 9 to receive the tongue 10 of a pear shaped ball 11 forming the pivotal member of the swivel, the same being secured to said shank by means of a screw and nut 12.

The jaws 13 are substantially alike in construction and each includes an enlarged upper portion 14, with side ears 15 that are pivotally connected together by means of screws 16 run in from opposite sides and having their inner ends riveted as indicated at 17 in Fig. 2. The said enlarged upper portions 14 of these hooks are hollowed out upon their inside to form an internal concaved recess to inclose the pear shaped ball 11. The under portions of these enlargements are cut away as at 18 to permit of the insertion of the pivotal member 11 previous to its attachment to a shank of the handle but after the hooks have been pivotally joined together and are in a spread or open position. Within each of these recesses is formed a rib 19 that serves to engage the sides of the pivotal member and when the parts are assembled the two ribs register to form an annular bearing to engage the pivotal member uniformly upon each side and hold it so as to turn freely therein. These ribs are obviously arranged above the pivotal point of the jaws and serve to spread the upper or short end of the jaws in a way to force the lower ends together as in the art of lifting and supporting a hose.

In the engagement of a hose the jaws must necessarily first be spread as shown in Fig. 1, by sliding the same back upon the pivotal member 11 so as to allow the lower ends to open and whereby they may be placed over a hose and then drawn together by pulling upon the handle as in lifting the hose. The pivotal member is made to engage the rib portion of the jaws above the pivotal point in a way to force the same out and throw the lower end in under the hose just as long as the tension is applied, as will be obvious. This operation and engagement may be effected whether the handle be arranged parallel or at angles to the jaws and the same can be freely turned at any time while in use if desired, to better adjust the hose to the work required of it.

Having thus described my invention what I claim and desire to secure by Letters Patent is:—

1. In a hose carrier of the class described, the combination of a pair of jaws pivotally connected together and each having a concaved recess upon the inner side of their upper portions forming an annular socket intermediate of said pivotal connections, a ball within the recess adapted to engage the jaws above the pivotal point to operate the same and having an extended stem and a handle pivotally connected to the stem of the ball for operating the same within the socket.

2. In a hose carrier of the class described, the combination with a pair of jaws pivotally connected together and having concave recesses forming a round socket intermediate of the pivotal connections, a pear shaped pivotal ball within the socket adapted to engage the jaws above the pivotal point to support the same and a handle connected with the outer end of the pivotal member for the operation of the jaws.

3. In a hose carrier of the class described, the combination with a pair of jaws pivotally connected together and recessed to form a round socket in their pivotal end portions and having an annular rib within the recess and above the pivotal point, a pear shaped sliding ball within the recess with its inclined side portions in engagement with the rib of the jaws before mentioned, and a handle pivotally connected to the outer end of the said ball.

Signed at Bridgeport, in the county of Fairfield and State of Connecticut, this 26th day of May, A. D., 1909.

HARVEY L. JENKINS.

Witnesses:
C. M. NEWMAN,
RUTH RAYMOND.